UNITED STATES PATENT OFFICE.

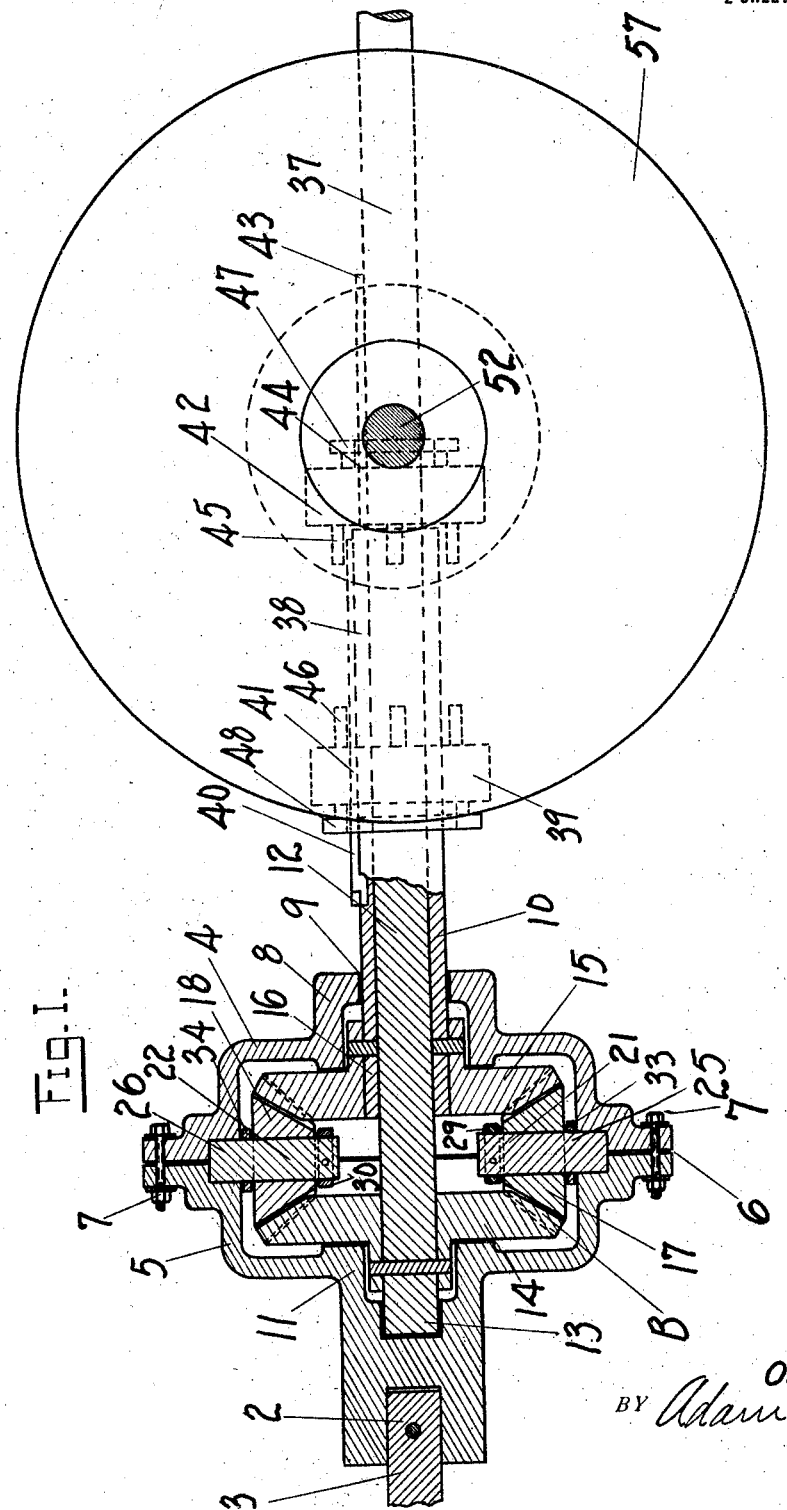

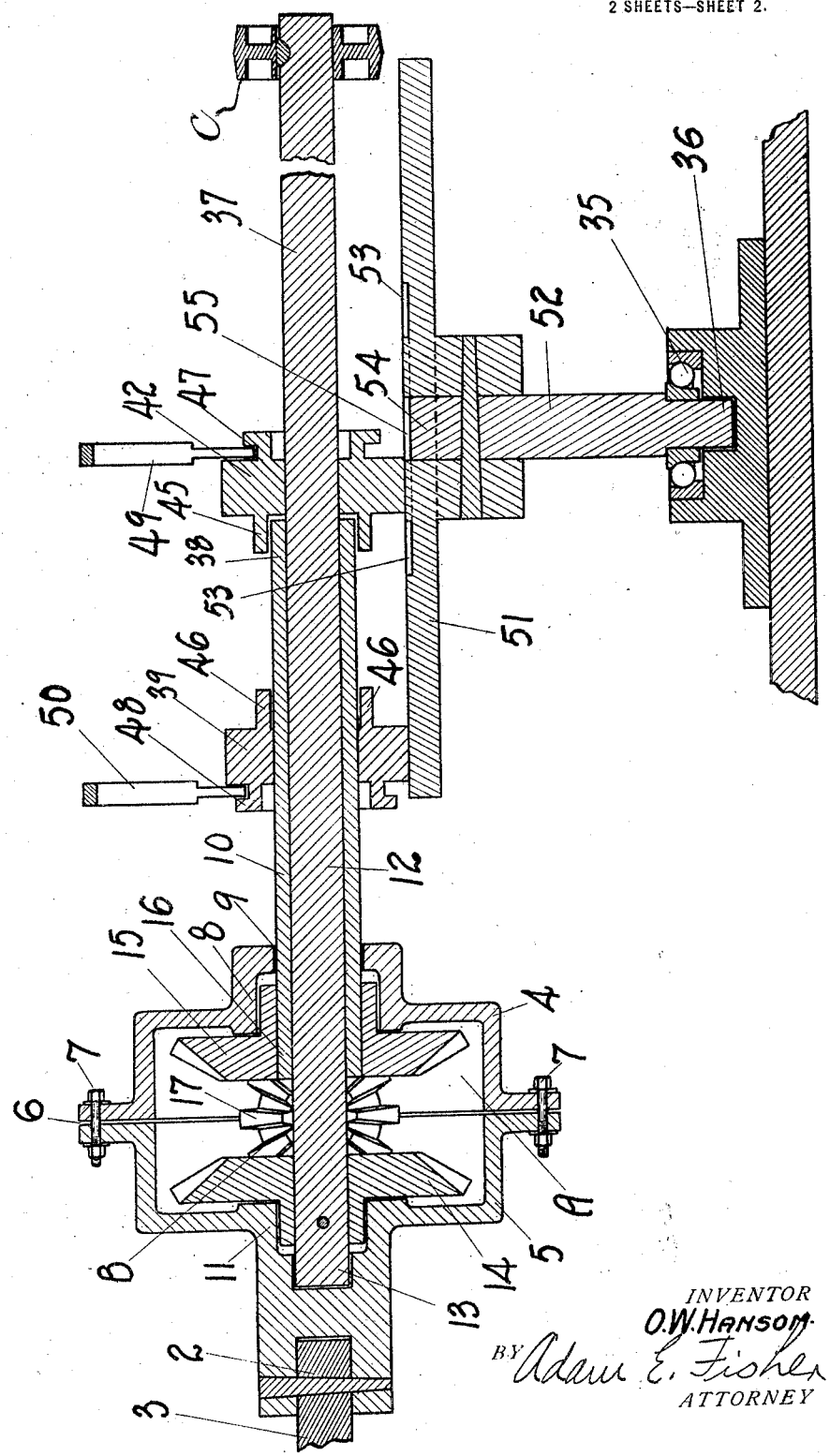

OSCAR W. HANSON, OF SALINA, KANSAS.

VARIABLE-SPEED MECHANISM.

1,402,493.    Specification of Letters Patent.    Patented Jan. 3, 1922.

Application filed November 26, 1919, Serial No. 340,934. Renewed June 22, 1921. Serial No. 479,705.

*To all whom it may concern:*

Be it known that I, OSCAR W. HANSON, a citizen of the United States, residing in the city of Salina, and State of Kansas, have invented new and useful Improvements in Variable-Speed Mechanisms, of which the following is a specification, reference being had to the accompanying drawings.

This invention pertains to variable speed transmission mechanisms for use upon automobiles, or trucks or tractors of any description, for the purpose of increasing or decreasing the speed of the vehicle at will; or for use upon and in connection with certain classes of machinery, such as lathes, drill presses, boring mills and similar machines where it is necessary and desirable to have a speed control mechanism, the velocity of which may be varied for different classes of work; or for any other purpose requiring such variable speed mechanism.

The primary object of this invention, therefore, is to provide a variable speed transmission mechanism of this class and character which may be readily installed upon and used in connection with the power transmission system as applied to any of the above or other classes of machines, and wherein friction gears are employed and the principle of frictional engagement is used in combination with a differential gear system as a method of producing such variations in speed by merely sliding one gear upon or over the face of the other.

A further object is to produce this device in as simple, practical and efficient a form as possible for the purposes intended, and so that the same may be readily installed upon any machine or mechanism.

Referring to the drawings which constitute a part of this specification

Fig. 1 shows a sectional side elevation of my improved mechanism with a portion of the housing broken away to reveal the construction and assemblage of the differential gears;

Fig. 2 shows a horizontal section of the same mechanism;

Referring more particularly to the drawings, my invention may be briefly described as a combination of the principle of the differential and the principle of the friction drive. In carrying out my invention in its preferred construction, I provide a suitable housing A which has direct connection through the rigidly joined link 2 with the source of power such as the engine shaft 3. Thus the revolution of the shaft 3 revolves the entire housing A. The housing A is made up of two half casings 4 and 5 adapted to meet along a central peripheral line 6 where they are bolted securely together by means of a plurality of bolts 7. The half casing 4 has a boxing 8 open at the side 9 for the accommodation of the tubular shaft 10. The other half casing 5 is likewise provided with a boxing 11 to accommodate the inner end of the solid shaft 12 which is journaled at 13 in said boxing 11. Mounted within the housing A thus made up is the differential gear system B made up of a plurality of bevel gears, including the bevel drive gear 14 rigidly mounted upon the end of the solid shaft 12 near the end 13 thereof, and spaced forwardly from said gear 14; a similar bevel drive gear 15 is likewise rigidly mounted upon the tubular shaft 10 at the end 16 thereof; and a plurality of power transmission or floating bevel gears as 17 and 18.

These floating gears are rotatively mounted upon stud-shafts 21 and 22, said stud-shafts being in turn rigidly anchored or clamped in the housing A in their sockets 25 and 26, which is accomplished by drawing the two half casings 4 and 5 together by means of the bolts 7. Suitable forward stops as 29 and 30 act to prevent the floating gears 17 and 18 from crowding too far forward upon their shafts, while suitable washers 33 and 34 located upon the jack shafts immediately back of the floating gears serve the similar purpose of holding the floating gears forward in mesh with the transmission gears 14 and 15. The solid shaft 12 passes slidingly through the tubular shaft 10, the former being snugly yet rotatively housed in the latter. The end 37 of the solid shaft 12 projects beyond the end 38 of the tubular shaft 10, and is connected with the driven mechanism, such as the pulley C.

A relatively small friction gear 39 is slidingly mounted upon the end of the tubular shaft 10 by means of the feather or key 40 rigidly attached to the shaft 10, passing through the key-way 41 formed transversely through the hub of the gear 39. Similarly, another small friction gear 42 of the same diameter as the gear 30 is likewise slidingly mounted upon the end of the solid shaft 12 by means of a key 43 rigidly attached to the shaft 12 and running through the key-way 44 formed in the gear 42. Thus the gears 39 and 42 are adapted for longitudinal movement back and forth upon their respective shafts, but cannot rotate thereupon. The adjacent faces of the gears 39 and 42 are provided with interlocking studs 45 and 46 adapted to engage one another when the two gears 39 and 42 move close together, thus locking the two gears together in respect of their rotative motion. Upon the outer faces of the two gears 39 and 42 are rigidly joined the annular shift-lever-collars 47 and 48 as a means of engaging the lower ends of the shift levers 49 and 50, by means of which the said gears 39 and 42 are shifted back and forth upon their respective shafts. Mounted transversely in frictional engagement with the two small twin gears 39 and 42 is the large friction disk 51, the same being rigidly keyed to its shaft 52, and the said shaft being suitably journaled at 36 and provided with a thrust bearing at 35 for maintaining the face of the disk in constant frictional contact with said twin gears 39 and 42. This friction disk 51 is mounted adjacent the end 38 of the tubular shaft 10 and has the annular groove 53 cut from its inner face concentric with the end 54 of the shaft 52, the purpose of which will be hereinafter described.

The end 54 of the shaft 52 does not come out flush with the inner face of the disk 51, but falls short thereof, so as to leave a recess 55 of equal depth with the depth of the groove 53. The groove 53 and the recess 55 are of a width a little in excess of the width of the twin friction gears 39 and 42, and are of a sufficient depth that when either of said gears are shifted over said groove 53 or said recess 55, they will be out of frictional engagement with said disk 51, and will revolve freely.

It will now be manifest that rotative power being applied through the link 2, the housing 1 will be caused to revolve, thereby carrying around with it the floating gears 17 and 18, the drive gears 15, and in fact the entire differential B, and thus normally tending to rotate the gears 39 and 42 with equal velocity, in the absence of any retarding force being applied to said gears 39 and 42. However, these gears being in frictional engagement with the disk 51, it is evident that such gears would be caused to rotate with different velocities; that is to say, the gear 39 rotating with a certain velocity near the outer periphery of the disk 51, the gear 42 would of necessity rotate with a less velocity being located near the center of said disk 51, and thus having to travel a less distance around said disk. Thus through the action of the differential B, the respective torques of the shafts 10 and 12 will be equalized or balanced, and the solid shaft 12 having direct connection with the machinery to be driven, as C, it is evident that the speed of such machinery will be governed accordingly. It is also manifest that by shifting the gear 39 inwardly toward the gear 42, there will be less rotation of or differential motion in the floating gears 17 and 18 of the differential A, upon their stud-shafts. In other words, the shafts 10 and 12 will rotate with more nearly equal velocities, which means that the shaft 12 will rotate with relatively greater velocity, thus increasing the speed of the machinery C to which said shaft 12 extends. It is also evident that by shifting the two disks together so that they become locked through the action of the locking studs 45 and 46, and with said gear 39 shifted over the groove 53, and the gear 42 over the recess 55, they would be out of frictional engagement with the disk 51, and there would be no differential movement whatever in the differential A, and the solid shaft 12 would then rotate with its greatest velocity and would transmit power direct to the machinery. It is also evident that by shifting the gear 42 across the recess 55 to the opposite or far side of the disk 51, that is, to the side approaching the pulley C, and by shifting the gear 39 into frictional engagement with the disk 51 at any point upon the near or opposite side of said disk and between its outer periphery and the groove 53, that the gear 39 would have greater leverage power than would the gear 42, whereby the gear 39 would overcome the gear 42, and cause the gear 42 to rotate in an opposite direction to the direction of rotation of the gear 39, whereby the direction of rotation of the shaft 12 would be reversed. Thus is accomplished the reversal of direction of rotation of the machinery.

Likewise, by shifting the gear 39 inwardly toward the housing so as to entirely clear it from the disk 51, and shifting the gear 42 over the recess 55, the mechanism is thrown into neutral position and no motion is transmitted through the shaft 12.

In operation, this apparatus may be applied to any of the classes of mechanisms set forth in the first part of this specification, or to other classes, and by shifting the gears 39 and 42 relative to the disk 51 as aforesaid, any required velocity of rotation may be readily accomplished, or the direction of rotation reversed, or the mechanism stopped.

While I have herein described a certain specific manner and method of constructing the elements of my invention, it is understood that I may vary from the same in minor details, not departing from the spirit of my invention, so as best to construct a practical device for the purpose intended, as defined in the appended claims.

What I claim to be new and patentable is:

1. In combination with a rotative power shaft, a variable speed transmission mechanism, comprising a housing rigidly linked to said power shaft; a differential gear system mounted within the housing; a solid shaft and a tubular shaft, the former being journaled through the latter, and both being extended from and having differential rotative motion controlled by said differential mechanism; two twin friction gears keyed for longitudinal sliding motion, one upon the outer end of said tubular shaft, and the other upon the protruding end of said solid shaft; a relatively large friction disk, rotatively mounted transversely to and in frictional contact with said twin gears, said disk having a central recess and an annular groove encircling said recess upon the side adjacent said twin gears and adapted to accommodate said gears for their free rotation when shifted thereto; means for shifting said twin gears toward or from each other along their respective shafts and across the face of said friction disk, so as to relatively retard or accelerate the resultant rotation of the solid shaft; and separate automatic means for interlocking said gears when shifted together over said central recess and annular groove so as to transmit direct rotation to said solid shaft.

2. In combination with a rotating power shaft, a variable speed transmission mechanism, comprising a solid shaft and a tubular shaft, the former journaled through the latter and extended therefrom at each end; a housing rotatively mounted over one end of the combined shafts, the solid shaft crossing the housing and being journaled in one side thereof and the tubular shaft stopping at and being journaled in the other side of said housing; a differential mechanism mounted within and anchored to said housing, and connecting said shafts, for taking care of relative variations in the velocities of rotation of said shafts; two twin friction gears slidingly and adjacently keyed, one each near the exterior ends of the tubular and solid shafts, the same having automatically interlocking studs upon their adjacent faces and annular shift collars rigidly attached to their outer faces; shift levers adapted to engage said collars; and a relatively large friction disk, having a central recess and an annular groove spaced therefrom cut in one face adapted to receive the peripheries of said friction gears and permit them to rotate freely, said disk being transversely and rotatively mounted upon its shaft and in frictional contact with said friction gears, and so that said gears may be locked together one each over said recess and annular groove for free rotation and consequent direct high speed transmission, and may be shifted to the side adjacent the tubular shaft for relatively slow positive drives, the gear on the tubular shaft clear to the inner periphery for the slowest power transmission, and off said periphery for neutral position, while the gear on the solid shaft may be shifted oppositely across the center for reversed motion.

3. In combination with a rotating power shaft, a variable speed transmission mechanism, comprising a solid shaft and a tubular shaft, the former journaled through the latter and extended therefrom at each end; a housing rotatively mounted over one end of the combined shafts, the solid shaft crossing the housing and being journaled in one side thereof and the tubular shaft stopping at and being journaled in the other side of said housing; a differential mechanism mounted within and anchored to said housing, and connecting said shafts, for taking care of relative variations in the velocities of rotation of said shafts; two twin friction gears slidingly and adjacently keyed, one each near the exterior ends of the tubular and solid shafts, same having automatically interlocking studs upon their adjacent faces and annular shift collars rigidly attached to their outer faces; shift levers adapted to engage said collars; a relatively large friction disk, having a central recess and an annular groove spaced therefrom cut in one face adapted to receive the peripheries of said friction gears and permit them to rotate freely, said disk being transversely and rotatively mounted upon its shaft and in frictional contact with said friction gears, and so that said gears may be locked together one each over said recess and annular groove for free rotation and consequent direct high speed transmission, and may be shifted to the side adjacent the tubular shaft for relatively slow positive drives, the gear on the tubular shaft clear to the outer periphery for the slowest power transmission, and off said periphery for neutral position, while the gear on the solid shaft may be shifted oppositely across the center for reversed motion; a shift lever engaging each of the twin gears through its shift key, as means for shifting the same upon their shafts; and an adjustable thrust bearing for the shaft of the large friction disk, as means for maintaining the same in close frictional contact with said twin gears.

4. In combination with a rotating power shaft, a variable speed transmission mechanism, comprising a solid shaft and a tubular shaft, the former journaled through the latter and extended therefrom at each end; a housing rotatively mounted over one end of the combined shafts, the solid shaft crossing the housing and being journaled in one side thereof and the tubular shaft stopping at and being journaled in the other side of said housing; a differential mechanism to accommodate the differential of rotative velocity of said shafts, the same including two bevel drive gears, keyed one each to the solid and tubular shafts, and a plurality of bevel floating gears disposed transversely to and meshing with said drive gears, and being rotatively mounted on stud shafts anchored in said housing; two small twin, friction gears, slidingly and adjacently keyed, one each to the exterior ends of the two shafts, the same embodying means for interlocking and means of engagement with a shift lever for longitudinal shifting upon their respective shafts; a relatively large friction disk, having a central recess and an annular groove spaced therefrom cut in one face adapted to receive the peripheries of said friction gears and permit them to rotate freely, said disk being transversely and rotatively mounted upon its shaft and in frictional contact with said friction gears, and so that said gears may be locked together one each over said recess and annular groove for free rotation and consequent direct high speed transmission, and may be shifted to the side adjacent the tubular shaft for relatively slow positive drives, the gear on the tubular shaft clear to the outer periphery for neutral position, while the gear on the solid shaft may be shifted oppositely across the center for reversed motion; a shift lever engaging each of the twin gears through its shift key, as means for shifting the same upon their shafts; and an adjustable thrust bearing for the shaft of the large friction disk, as means for maintaining the same in close frictional contact with said twin gears.

5. In combination with a rotating power shaft, a variable speed transmission mechanism, comprising a solid shaft and a tubular shaft, the former journaled through the latter and extended therefrom at each end; a housing rotatively mounted over one end of the combined shafts, the solid shaft crossing the housing and being journaled in one side thereof, and the tubular shaft stopping at and being journaled in the other side of said housing; a differential mechanism to accommodate the differential of rotative velocity of said shafts, the same including two bevel drive gears, keyed one each to the solid and tubular shafts, and a plurality of bevel floating gears, disposed transversely to and meshing with said drive gears, and being rotatively mounted on stud shafts anchored in said housing; two twin, friction gears, slidingly and adjacently keyed, one each to the exterior ends of the two shafts; interlocking studs permanently joined to the adjacent faces of the twin gears as means for automatically locking the same together when shifted together; an annular shift collar permanently joined to the outer face of each twin gear, as means of engagement with a shift lever; and a shift lever engaging each of the twin gears through its shift key, as means for shifting the same upon their shafts.

6. In combination with a rotative power shaft, a variable speed transmission mechanism, comprising a solid shaft and a tubular shaft, the former journaled through the latter and extended therefrom at each end; a housing rotatively mounted over one end of the combined shafts, the solid shaft crossing the housing and being journaled in one side thereof, and the tubular shaft stopping at and being journaled in the other side of said housing; a differential mechanism mounted within and anchored to said housing, and connecting said shafts, for taking care of relative variations in the velocities of rotation of said shafts; two twin friction gears, slidingly and adjacently keyed, one each to the exterior ends of the two shafts; interlocking studs permanently joined to the adjacent faces of the twin gears as means for automatically locking the same together when shifted together; an annular shift collar permanently joined to the outer face of each twin gear, as means of engagement with a shift lever; a shift lever engaging each of the twin gears through its shift key, as means for shifting the same upon their shafts; and an adjustable thrust bearing for the shaft of the large friction disk, as means for maintaining the same in close frictional contact with said twin gears.

7. In combination with a rotating power shaft, a variable speed transmission mechanism, comprising a friction disk shaft; a large friction disk recessed upon one face centrally and annularly at a spaced distance from the center, said disk being rotatively mounted upon its said shaft; an adjustable thrust bearing for said shaft; a solid shaft and a tubular shaft, the former journaled through the latter, and both being disposed diametrically across the recessed face of the friction disk; a twin gear slidingly keyed to the end of each shaft in frictional contact with the recessed face of said friction disk and adapted to shift back and forth across the same; means for shifting said twin gears back and forth upon their shafts; means for automatically interlocking said gears when shifted together; a differential mechanism mounted on the opposite ends of said shafts and engaging said ends so as to accommodate and balance the different stresses between said shafts resulting from variations in velocity of rotation thereof; and a housing for said differential mechanism, the same being rigidly connected with said power shaft and with said differential mechanism so as to cause the differential gears to rotate with the housing, for the purposes intended.

OSCAR W. HANSON.

Witnesses:
A. K. Dohle,
A. M. Dowd.